(12) United States Patent
Evans et al.

(10) Patent No.: US 7,408,878 B2
(45) Date of Patent: Aug. 5, 2008

(54) SYSTEM PACKET INTERFACE

(75) Inventors: Adrian B. Evans, Ottawa (CA); Mohammed I. Tatar, Ottawa (CA); Cedrik K. Begin, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 904 days.

(21) Appl. No.: 10/458,357

(22) Filed: Jun. 10, 2003

(65) Prior Publication Data

US 2004/0252684 A1    Dec. 16, 2004

(51) Int. Cl.
*H04L 12/26*    (2006.01)

(52) U.S. Cl. .................. 370/232; 370/278; 370/363; 370/381

(58) Field of Classification Search .............. 370/362, 370/451, 450, 489, 232, 278, 363, 381; 709/212, 709/231, 232, 233, 245
See application file for complete search history.

(56) References Cited

U.S. PATENT DOCUMENTS 6,091,729 A * 7/2000 Dove ..................... 370/395.4

OTHER PUBLICATIONS

System Packet Interface level 3:OC-48 System Interface for Physical and Link layer Devices, OIF (optical Internetworking Forum).*
System Packet Interface level 4 (SPI-4) phase 2:OC-192 System Interface for Physical and Link layer Devices, OIF (optical Internetworking Forum).*
Richard Cam and Russ Tuck, Optical Internetworking Forum, "System Packet Interface Level 4 (SPI-4) Phase 2: OC-192 System Interface For Physical and Link Layer Devices," Jan. 2001, pp. 1-64.
Chris Bergen and Jeffrey Lynch, Network Processing Forum, "Streaming Interface (NPSI) Implementation Agreement," Oct. 18, 2002, pp. 1-82.
Berry, Mike, Silicon Logic Engineering, "All SPI-4s Are Not Created Equal," EDN-Electrical Design Dews, Feb. 20, 2003, vol. 48, No. 4, pp. 73-76.
Intel, "SPI-4 Phase 2 Performance in Gigabit Ethernet Media Access Controllers," Apr. 27, 2002, Intel Corporation, Order No. 250643-001, pp. 1-17.
TriCN'S SPI-4.2 I/O Interface Technology Supports NPFSI, SFI and SPI Standards, Jul. 8, 2002, p. 1 of 1.

* cited by examiner

*Primary Examiner*—Edan Orgad
*Assistant Examiner*—Jay P Patel
(74) *Attorney, Agent, or Firm*—Campbell Stephenson LLP

(57) ABSTRACT

An apparatus including a first integrated circuit (IC), a second IC, and an interface coupling the first IC to the second IC. The interface transfers payload control information between the first IC and the second IC utilizing a number of data transmission lines. On the clock cycle transition following the transfer of payload control information, the interface transfers packetized data between the first IC and the second IC at a data rate of at least approximately 20 Gbps utilizing the same transmission lines. A one-bit control signal is used by the interface to identify when payload control information is present on all of the data transmission lines.

47 Claims, 12 Drawing Sheets

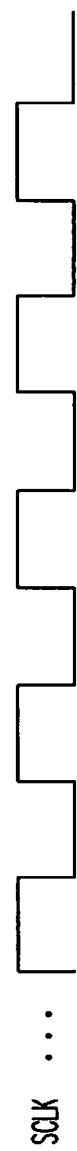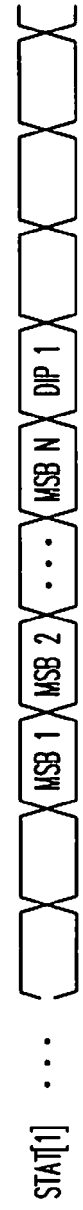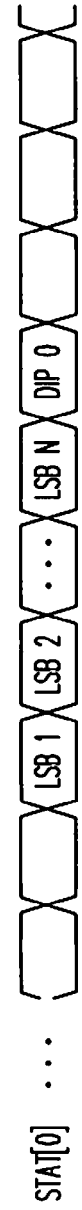
FIG. 3
FIG. 10

SYSTEM PACKET INTERFACE

BACKGROUND OF THE INVENTION

1. Field of the Invention

The present invention relates to communications devices, and particularly to interfacing at least two integrated circuits of a communications device.

2. Description of the Related Art

In a communications network, network devices receive data at one of a set of input interfaces and forward the data to one or more of a set of output interfaces. Users typically require that such network devices operate as quickly as possible in order to maintain a high data rate. Switches, one type of network device, are typically data link layer devices that enable multiple physical networks (e.g., local area network (LAN) or wide area network (WAN) segments) to be interconnected into a single-larger network. In the most general sense, these types of networks transport data in the form of packets. A packet is a logical grouping of information sent as a data unit over a transmission medium. Packets typically include header and/or trailer information used, for example, for routing, synchronization, and error control. The header and/or trailer information surrounds payload data contained in the packet. The terns cell, datagram, message, frame, and segment are also used to describe logical information groupings at various layers of the Reference Model for Open Systems Interconnection (OSI reference model). As used herein, the term "packet" should be understood in its broadest sense, and can encompass other terms including cell, datagram, message, frame, and segment, and the like.

One factor on which the data rate of a network device (e.g., a switch) depends is the board-level system interconnect interface of the network device. The board-level system interconnect interface is the interface by which board level devices such as application specific integrated circuits (ASICs), network processing chips (NPUs), packet processing engines, queuing devices, fabric devices, and other board level devices directly communicate with each other. Devices coupled with a board-level system interconnect interface can be on the same board, or on different boards. With a poorly designed board-level system interface, a network device may be unable to efficiently transfer packets at a high data rate through the network device. This can adversely impact the over all data rate of the network device.

One commonly-utilized board-level interface is the SPI-4.2 system packet interface described by the Optical Internetworking Forum in "System Packet Interface Level 4 (SPI-4) Phase 2: OC-192 System Interface for Physical and Link Layer Devices, Optical Internetworking Forum Implementation Agreement, January 2001" (the "SPI-4.2 interface specification"). The SPI-4.2 interface is a system packet interface for OC192 physical and link layer devices designed to provide a data rate of approximately 10 Gbps between devices. However, while commonly implemented, the SPI-4.2 is not without limitations. For example, the SPI-4.2 interface does not provide a practical solution for many network device configurations which desire to operate at data rates substantially higher than 10 Gpbs. Accordingly, it is desirable to have an interface similar to the SPI-4.2 interface, but yet provides a data rate higher than currently available with the SPI-4.2 interface.

SUMMARY OF THE INVENTION

It has been discovered that integrated circuits of a network device operable to transmit data from and to a network can use a transmit and receive interface to transmit the data between other integrated circuits of the network device. The interface is capable of transferring data and buffer status between the integrated circuits at high data rates so that the interface does not significantly slow down network data transfers.

Accordingly, one aspect of the present invention provides an apparatus including a first integrated circuit (IC), a second IC, and an interface coupling the first IC to the second IC. The interface transfers payload control information between the first IC and the second IC utilizing a number of data transmission lines. On the clock cycle transition following the transfer of payload control information, the interface transfers packetized data between the first IC and the second IC at a data rate of at least approximately 20 Gbps utilizing the same transmission lines. A one-bit control signal is used by the interface to identify when payload control information is present on all of the data transmission lines.

Another embodiment of the present invention provides for an apparatus including a transmit data bus, a transmit control signal, a receive data bus, and a receive control signal. The transmit data bus is configured to transmit payload control information, and on the clock cycle transition following a transfer of payload control information, transmit packetized data at a data rate of at least approximately 20 Gbps. The one bit transmit control signal is used to identify whether data on the transmit data bus is payload control information or packetized data. The receive data bus is configured to receive payload control information, and on the clock cycle transition following receipt of the payload control information, receive packetized data at a data rate of at least approximately 20 Gbps. The receive data bus operates independently of the transmit data bus. The one bit receive control signal is used to identify whether data on the receive data bus is payload control information or packetized data.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and accompanying drawings, in which like reference numbers indicate like features.

FIG. 3 illustrates a control word in accordance with one embodiment of the present invention;

FIG. 10 is a timing diagram of a status bus in accordance with the present invention.

DETAILED DESCRIPTION

The following sets forth a detailed description of at least the best contemplated mode for carrying out the one or more devices and/or processes described herein. The description is intended to be illustrative and should not be taken to be limiting.

Introduction

The present invention provides a high bandwidth interface for the transfer of data within a network device. Many networks operate at high bandwidths. Consequently, network devices must transfer network data (e.g. packets, frames, cells, etc.) internally at rates no slower than the data rate of the network. The interface between integrated circuits within a network device is one critical data path that affects the data rate. Such an interface should be capable of handling bandwidths at rates which are at least comparable to, if not greater than, the network bandwidth so as to not bottleneck network traffic. The present invention provides an interface that enables network data to be transferred between integrated circuits of a network device at high bandwidths (e.g., 20 Gbs), and can also be configured to interface with the SPI-4.2 interface.

An Exemplary Network Device

Figure 1:
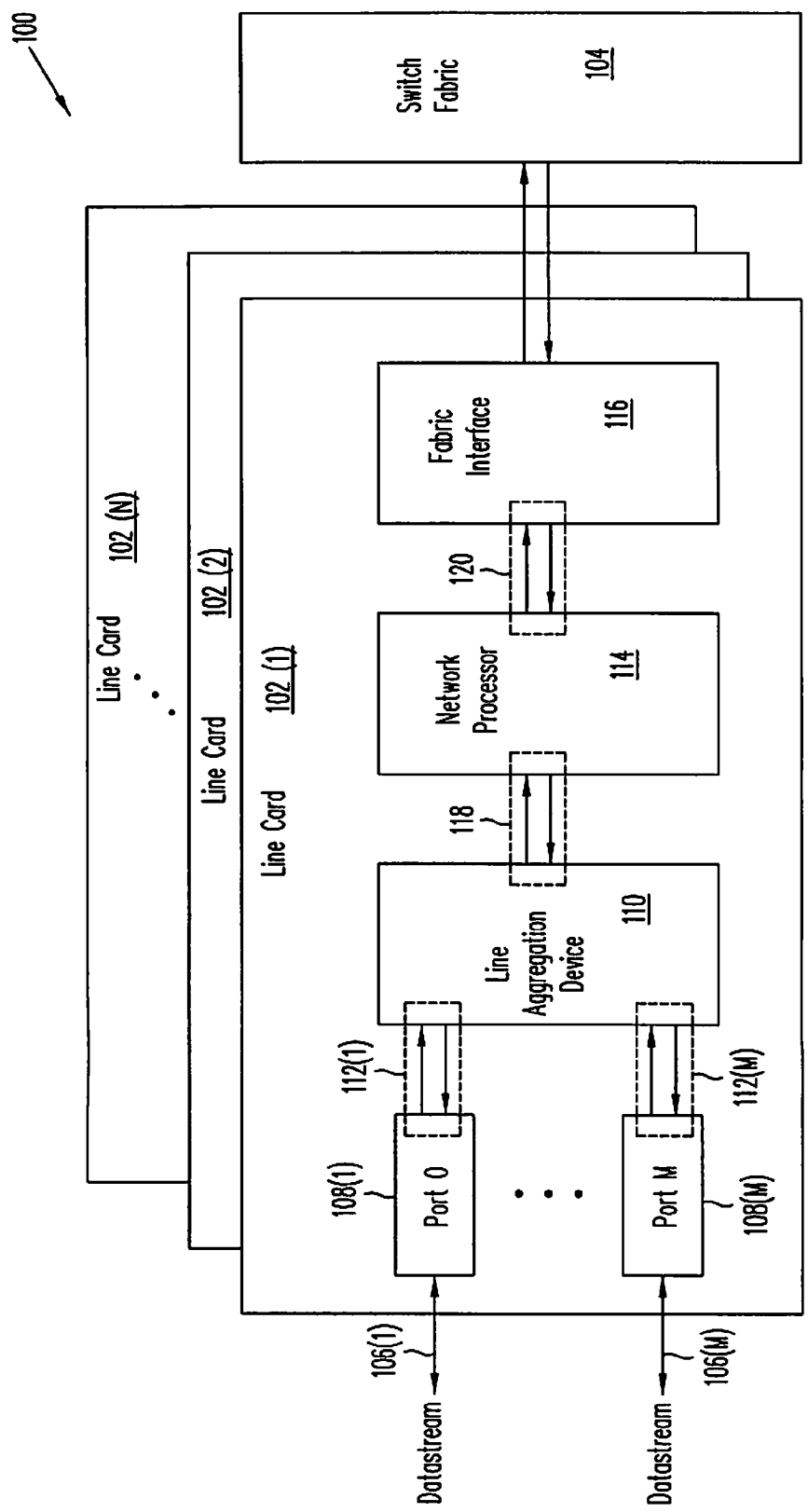
FIG. 1 is a block diagram of a system employing the present invention.

FIG. 1 is a block diagram of a system 100 employing the present invention. In the example of FIG. 1, system 100 is a router, although the present invention can be employed in any network device utilized in the transfer of data in a network (e.g., a switch, a network storage processing device, etc). System 100 includes a number of (e.g., N) line cards 102, each having similar circuitry and each coupled to a switch fabric 104. Herein, line card 102 refers to any of line cards 102(1)-102(N), unless otherwise specified. Various hardware and software components associated with system 100 are not shown in order to aid clarity.

It will be noted that the variable identifier "N" is used in FIG. 1 (and in other parts of this application) to more simply designate the final element (e.g., line card 102(N)) of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

In the example of FIG. 1, line card 102 transmits and receives data streams to and from clients (not shown) of a local network (not shown) over communication lines 106. In one embodiment of the present invention, communication lines 106 carry packets in accordance with the 10 Gigabit Ethernet (GbE) protocol.

The incoming packets provided on communication lines 106 are received by ports 108 of line card 102. From ports 108, the packets are transferred to a link aggregation device 110 via an interface 112. From link aggregation device 110, packets are transferred to a network processor 114 and a fabric interface 116 via interfaces 118 and 120 respectively. Generally, fabric interface 116 converts a stream of data from one format (e.g., packets) to another (e.g., common switch interface cells). From fabric interface 116 the packets are transferred to switch fabric 104. In similar fashion, the packets are transferred from switch fabric 104 to client devices along an opposite path through system 100.

So as to not bottleneck network traffic, it is critical to get the packets through system 100 as quickly as possible. Thus, interfaces 112, 118, and 120 should provide high data transfer rates for the packets transferred between the respective integrated circuits. Accordingly, in one embodiment of the present invention, interfaces 112, 118, and 120 enable packets to be transferred between integrated circuits at a data rate of approximately 20 Gbs (e.g., between 19 Gbps and 38 Gbps). In addition, interfaces 112, 118, 120 are compatible with existing interfaces, for example the System Packet Interface Level 4 Phase 2 (SPI -4.2) interface. Devices configured to operate in accordance with the interface of the present invention are compatible with, and may transfer data between, devices configured with the SPI-4.2 interface and interfaces similar thereto. It is noted that the system and integrated circuits of FIG. 1 provide only an exemplary context in which to describe the present invention. The present invention is not limited to interfacing the integrated circuits of FIG. 1, but can be used to interface other devices which are utilized in the transfer of network data.

An Exemplary Interface

Figure 2A:
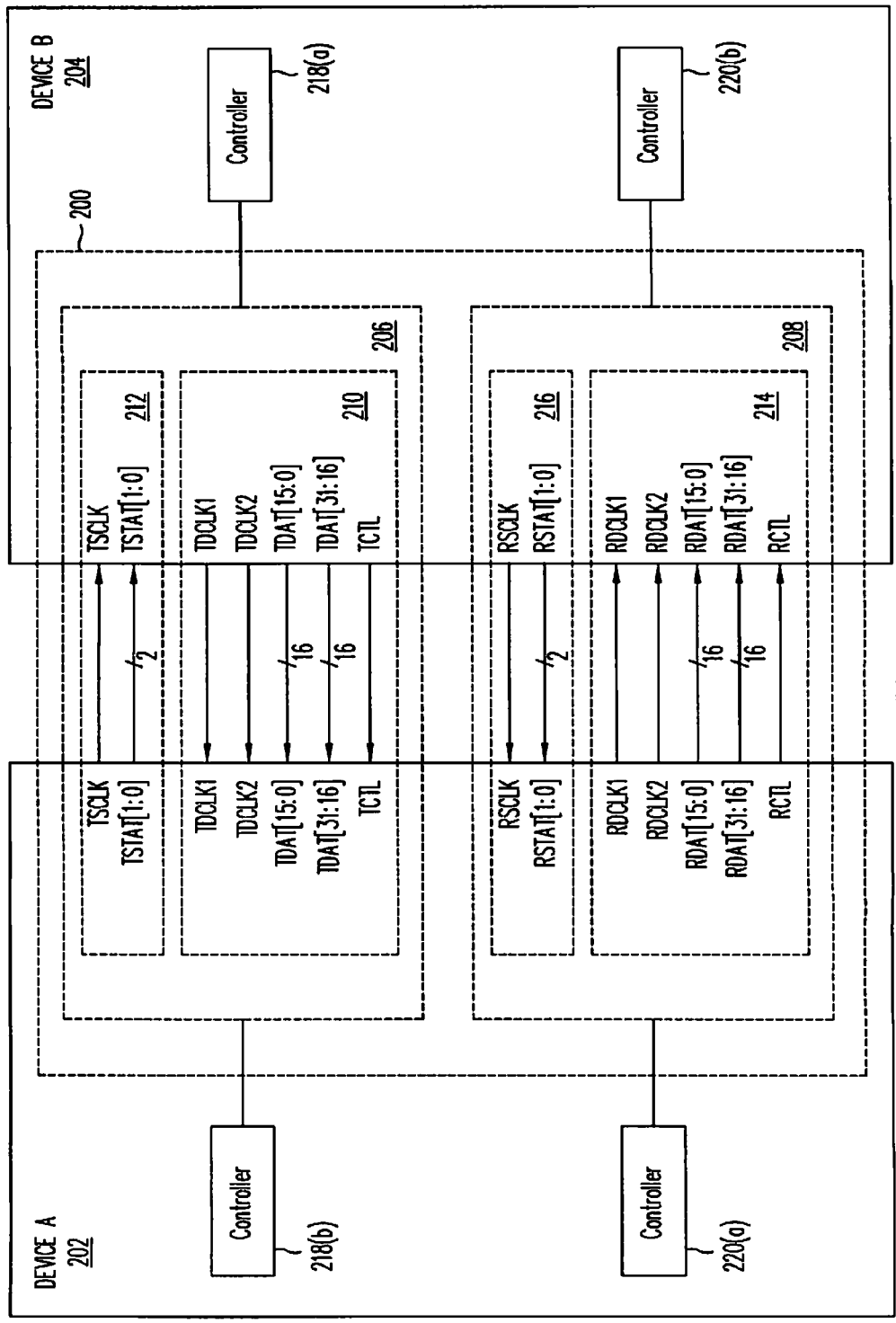
FIGS. 2A and 2B are block diagrams illustrating an exemplary interface according to various embodiments of the present invention.

FIG. 2A is a block diagram illustrating an interface according to one embodiment of the present invention. In the embodiment illustrated in FIG. 2A, interface 200 enables data to be transferred between a device A 202 and a device B 204 at high data rates (e.g., approximately equal to 20 Gbps). In one embodiment of the present invention, device 202 and device 204 operate at different layers of the OSI reference model. For example, device 202 may be a physical layer device (e.g., SONET framer, Ethernet MAC, and the like) and device 204 may be a network layer device (e.g., network processors, and other such devices).

Interface 200 includes a transmit interface 206 and a receive interface 208. Transmit interface 206 includes a transmit data bus 210 and a transmit status bus 212. Receive interface 208 includes a receive data bus 214 and a receive status bus 216. Transmit data bus 210 and receive data bus 214 are unidirectional data busses configured to transfer data in opposite directions from each other. Transmit interface 206 and receive interface 208 include out-of-band status information for each respective device 202 and 204 so that the FIFOs of the each receiving device may be more efficiently utilized. As used herein, a receiving device (or a sink) is used to refer to a device configured to receive data on a data bus in accordance with the present invention, and a transmitting device (or a source) is used to refer to a device configured to transmit data on a data bus in accordance with the present invention. A single device can be both a receiving device and a transmitting device For example, device 202 is a receiving device with respect to transmit interface 206, but is a transmitting device with respect to receiving interface 208. Similarly, device 204 is a receiving device with respect to receive interface 208, but is a transmitting device with respect to transmit interface 206. In one embodiment of the present invention, transmit data bus 210, transmit status bus 212, receive data bus 214 and receive status bus 216 use low-voltage differential signaling (LVDS) as defined in IEEE 1596.3-1996. However other comparable signaling techniques may be used.

Transmit data bus 210 includes two transmit data clock signals (TDCLK1 and TDCLK2), 32 data signals (TDAT[15:0] and TDAT[31:16]), and a single transmit control signal (TCTL). Transmit status bus 212 includes a transmit status clock signal (TSCLK) and two transmit status signals (TSTAT[1:0]). Similarly, receive data bus 214 includes two transmit data clock signals (RDCLK1 and RDCLK2), 32 data signals (RDAT[15:0] and RDAT[31:16]) and a single control signal (RCTL). Receive status bus 216 includes receive status clock signal (RSCLK) and two receive status signals (RSTAT[1:0]). Transmit interface 206 and receive interface 208 are coupled to controllers 218 and 220, respectively. Controllers 218 and 220 contain configuration information for each interface and also operate to control each interface. Transmit interface 206 and receive interface 208 operate independently from each other. Both interfaces are equivalent to each other except that each transfers data and status in opposite directions. Accordingly, to aid clarity while providing brevity, reference will be made to the signals of each interface irrespective of whether they are part of transmit interface 206 or receive interface 208. For example, SCLK will be used to refer to both TSCLK and RSCLK, DAT[15:0] will refer to both TDAT[15:0] and RDAT[15:0], and so on.

In one embodiment, interface 200 utilizes clock-forwarding. By using clock-forwarding, separate clock signals are provided on each bus rather than embedding the clock signals in other signals. This saves the receiving device the burden of having to recover the clock signal. In one embodiment of the present invention, DCLK1 and DCLK2 utilize source-synchronous, double-edge clocking at a rate of 311 MHz. Double-edge clocking at a rate of 311 Mhz is equivalent to a data rate of 622 Mbps per signal. Since DAT[31:0] includes 32 data signals, an interface according to the present invention provides a data rate of 622 Mbps*32 or approximately 20 Gbs.

As described more fully below, data on DAT[31:0] can be aligned with a clock signal either statically or dynamically. In static alignment, the phase relationship between the data bits and their corresponding clock must be tightly controlled. In dynamic alignment, the receiver compensates for the phase difference between the clock and the individual data bits. It is preferable to use dynamic alignment when the signal path length and/or the frequency of operation create significant skew between the clock and the data. In static alignment, DCLK2 is used to sample DAT[31:16] and DCLK1 is used to sample DAT[15:0] and CTL. DCLK1 and DCLK2 are in phase with each other. In dynamic alignment, it is preferable that DCLK1 be used to sample DAT[31:0] and CTL. DCLK2 may be tri-stated.

Data words and in-band control words are transferred between device 202 and 204 on DAT[31:0]. As used herein, an "sin-band" signal describes a signal that is transferred over the same communication lines as another signal. As used herein a word is 32 bits. A data word, as used herein, refers to 32 bits of packet data (including some or all of header information, payload data, trailer information, padding, etc.) A control word, as described in FIG. 3 below, refers to 32 bits of control information, parity information, and other information. A word (either a control word or a data word) is transferred on DAT [31:0] in two portions, an upper portion and a lower portion. DAT[15:0] is used to transfer the lower 16 bits of a word and DAT[31:16] is used to transfer the upper 16 bits of the word. The data transmit procedure and a description of exemplary control information is provided below.

A single control signal, CTL, is used to distinguish data words and control words on DAT[31:0]. CTL accompanies each transfer on DAT[31:0]. For example, in the presently described embodiment, CTL is driven off of the rising and the falling edges of CLK1 because data is transferred on both the rising and falling edges of CLK1. CTL transitions high (e.g., a logic 1) to signal that a control word is present on DAT[31:0]. CTL remains low (e.g., a logic 0) otherwise. The use of a single control line provides compatibility between the interface of the present invention and other interfaces (e.g., the data rate of control words transmitted on the present invention is compatible with the SPI-4.2 interface). Additionally, the use of a single control line to identify control words on DAT[31:0] reduces the complexity of a receiving device. For example, with a single control line, a receiving device need only process a single control word in one bit time.

In addition to providing an interface to transfer data and control words at a rate of approximately 20 Gbps, interface 200 also provides for the transfer of status information independently from the transfer of data and control words. With reference to FIG. 2, transmit status bus 212 includes TSTAT[1:0] and TSCLK. Similarly, receive status bus 216 includes RSTAT[1:0] and RSCLK. STAT[1:0] provides downstream queue information from a receiving device to a transmitting device. STAT[1:0] transfers first-in first-out queue (FIFO) status information, error detection and framing information and is clocked by SCLK. In one embodiment, the data rate of the status is $\frac{1}{8}^{th}$ the data rate of the data bus. A detailed description of the transfer of status information is provided below.

Figure 2B:
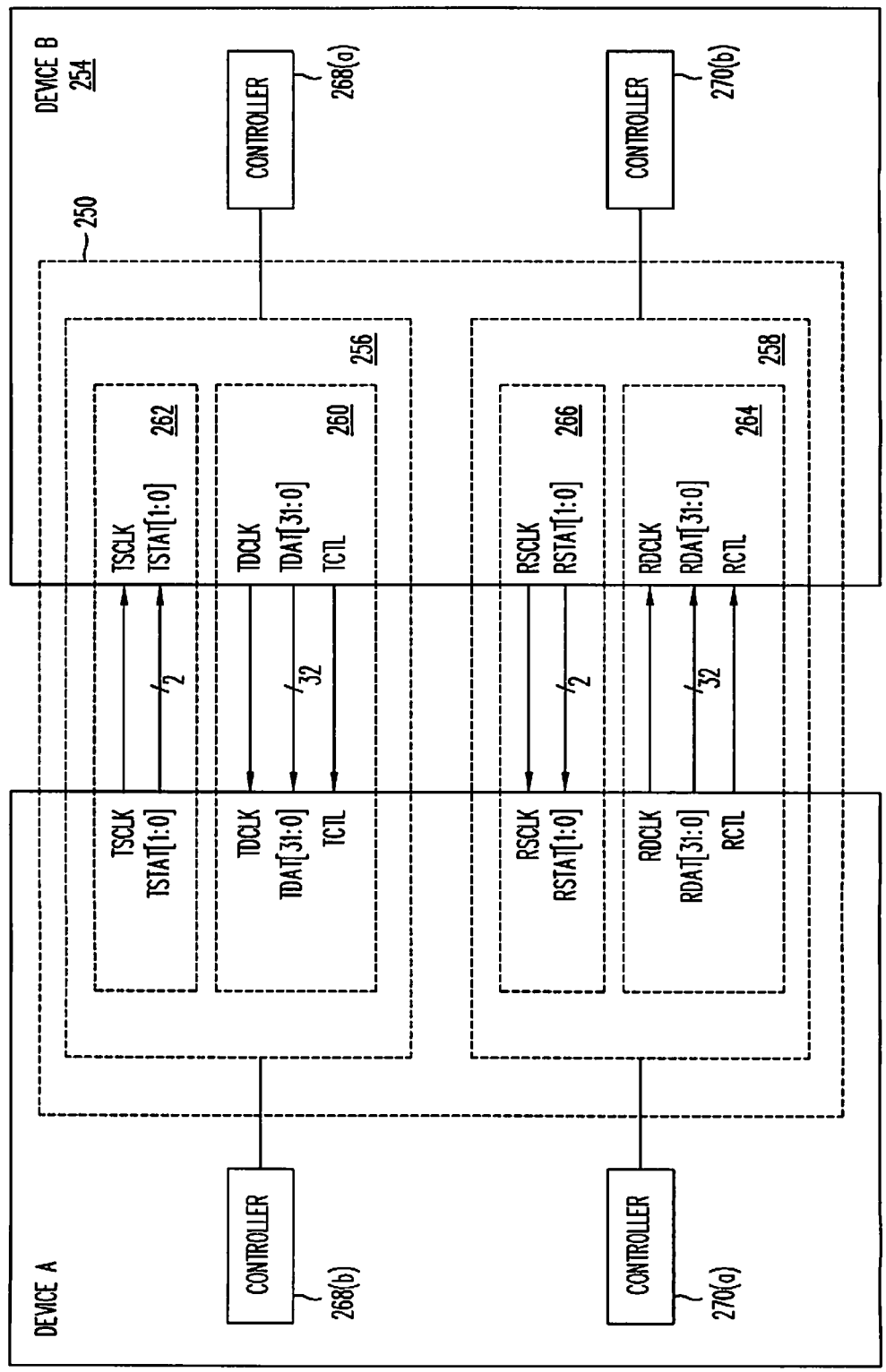

FIG. 2B illustrates an alternative embodiment of the present invention. Interface 250 is similar to interface 200 except that a single clock, DCLK, is provided for each interface. One advantage that the embodiment illustrated in FIG. 2A provides over the embodiment illustrated in FIG. 2B is that a bit-deskew circuit is not required. Because the embodiment shown in FIG. 2A generally requires that data signal traces be closely matched, associating fewer signals with a clock signal makes it easier to align the signals. For example, by providing two clock signals, DCLK1 and DCLK2, for DAT[15:0] and DAT[31:16], respectively, DCLK1 and DCLK2 will be less affected by jitter, noise and other impacts associated with circuit design. Thus, the constraints on the routing of the signals between two devices interfaced with the present invention can be relaxed.

Data Transfer Procedure

Prior to discussing the details of how data and control words are transferred on DAT[31:0], it is beneficial to introduce and describe an exemplary control word.

Exemplary Control Information

FIG. 3 illustrates a control word 300 in accordance with one embodiment of the present invention. Control word 300 is 32 bits wide and is used to identify, among other things, a start of packet, an end of packet, and a port address for packets transferred on DAT[31:0]. In the presently described embodiment, control word 300 includes a parity field (DIP-4) 302, a port address field (ADR) 304, a start-of-packet (SOP) field 306, an end-of-packet (EOP) status field 308, a type field 310, an extended parity field 312, a reserved field 314, and an extended EOP status field 316. It is recognized that other embodiments may group the information provided in fields 302-316 differently (encoded, combine multiple fields, etc.). Also, other embodiments may include a subset of the information provided in fields 302-316.

Parity field 302 and extended parity field 312 provide parity over the control word and the immediately preceding data words. Parity field 302 is computed over the lower portion of the control word transferred on DAT[15:0] and also the immediately preceding 16 bits of the data words transferred on DAT[15:0] following the last control word. Extended parity field 312 is computed over the upper portion of the control word transferred on DAT[31:16] and also the immediately preceding 16 bits of the data words transferred on DAT[31:16] following the last control word. In one embodiment, the parity is a 4-bit Diagonal Interleaved Parity (DIP-4) as described in "System Packet Interface Level 4 (SPI-4) Phase 2: OC-192 System Interface for Physical and Link Layer Devices, Optical Internetworking Forum Implementation Agreement, January 2001".

Port address field 304 is the 8-bit port address of the data word immediately following the control word. While the presently described embodiment supports 256 port addresses, other embodiments can support more port addresses, by increasing the size port address field 304 and/or by use of address extension for example.

Start-of-packet field 306 identifies whether the data immediately following the control word is the start of a packet. In the presently described embodiment, SOP field 306 is set to 1 to identify a start of packet. EOPS field 308 and EOPS_EX field 316 identify the status of the data immediately preceding the control word and are also used to locate the last byte of the packet. Table 1 below provides the values of EOP status field 308 and EOPS_EX field 316 along with the corresponding meaning for each.

TABLE 1

| EOPS | EOPS_EX | Description |
| --- | --- | --- |
| 00 | X | Not an EOP |
| 01 | X | EOP Abort (error) |
| 10 | 0 | EOP, 4 bytes are valid (on DAT[31:0]) |
| 10 | 1 | EOP, 1 byte is valid (on DAT[31:24]) |
| 11 | 0 | EOP, 2 bytes are valid (on DAT[31:16]) |
| 11 | 1 | EOP, 3 bytes are valid (on DAT[31:8]) |

Type field 310 in combination with port address field 304 indicates whether the control word is a payload control word (bit 15=1), a training control word (bit 15=0), or an idle control word (bit 15=0). If the control word is a payload control word, then data on the clock cycle immediately following the payload control word is packet data. If the control word is a training control word, then the data on the transfer following the training control word is for training (described below) and all the bits of port address field 304 are set to 1. If the control word is an idle control word, then no data is to follow and all the bits of port address field 304 are set to 0.

Transferring Control Words on the Data Bus

Data words, control words, and training sequences can be transferred on the data bus. The present invention utilizes a single control line, CTL, to signal when control words are present on DAT[31:0]. In one embodiment, when the control line is high, control words are present on DAT[31:0]. In one embodiment of the present invention, the upper portion of the control word (i.e., bits 31-16) is transferred on DAT[31:16] and, in the same cycle, the lower portion of the control word (i.e., bits 15-0) is transferred on DAT[15:0].

Data is transferred on DAT[31:0] in bursts that have a programmable maximum length (referred to as MaxBurst1 or MaxBurst2). It is preferable that the burst length be a multiple of 32 bytes or, if not a multiple of 32 bytes, be terminated with an EOP control word. Complete packets can be transferred in a single burst, or broken up into multiple bursts with the transfer of other packets in between. Once a burst transfer has begun, data words are sent uninterrupted until an EOP control word is received or a multiple of 32 bytes has been reached.

Using an example of a 43 byte packet, Table 2 identifies the order in which data words are transferred over DAT[31:0], according to one embodiment of the present invention.

TABLE 2

|  | Bits 31-24 | Bits 23-16 | Bits 15-8 | Bits 7-0 |
| --- | --- | --- | --- | --- |
| Data Word 1 | Byte 1 | Byte 2 | Byte 3 | Byte 4 |
| Data Word 2 | Byte 5 | Byte 6 | Byte 7 | Byte 8 |
| . |  |  |  |  |
| . |  |  |  |  |
| Data Word 10 | Byte 37 | Byte 38 | Byte 39 | Byte 40 |
| Data Word 11 | Byte 41 | Byte 42 | Byte 43 | 0 0 0 0 0 0 0 0 |

Initially, the first four bytes of the 43 byte packet are transferred on DAT[31:0], with byte 1 transferred on bits 31-24 and byte 4 transferred on bits 7-0. The next 4 bytes, bytes 5-8, are then transferred on DAT[31:0], with byte 5 transferred on bits 31-24, and byte 8 transferred on bits 7-0. This ordering continues until the last data word. Because the transfer does not end on an 32 byte boundary, any unused bytes are set to 0. In the example in Table 2, bits 7-0 are set to 0. It is recognized that methods other than setting unused bytes to zero may be used to account for a transfer that does not end on a 32 byte boundary (e.g., using values other than zero, etc.).

Data Transfer Procedure

Figure 4:
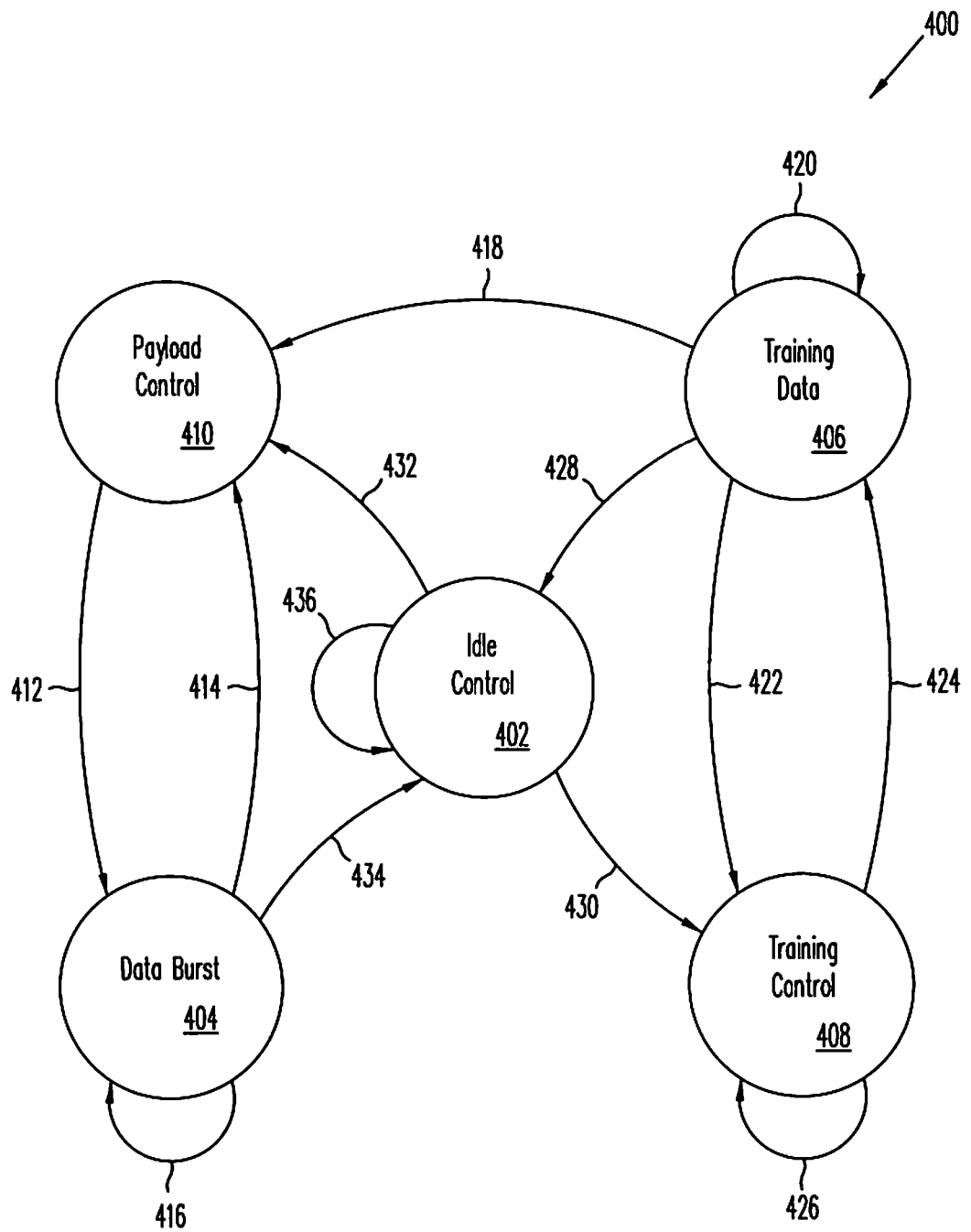
FIG. 4 illustrates a state diagram showing the various states of a data bus of the present invention.

Turning now to the data transfer procedure, FIG. 4 illustrates a state diagram 400 showing the various states of the present invention and the transitions there between. FIG. 4 is described with reference to the signals illustrated in FIG. 2.

As seen from FIG. 4, the data bus of an interface in accordance with the present invention comprises five states: idle control state 402, data burst state 404, training data state 406, training control state 408, and payload control state 410. Depending on the state, the data bus (e.g., DAT[31:0]) is configured to transfer idle control words, payload control words, data words, training control words, or training data words. To aid in clarity, state diagram 400 will be described with the data bus initially in idle control state 402.

Idle State

A data bus in idle state 402 is configured to transfer an idle control word in the current cycle. The data bus can remain resident in idle control state 402 (represented by transition 436) and continue transferring idle control words. From idle control state 402, the data bus can transition to payload control state 410 (via transition 432) to begin a data burst or the data bus can transition to training control state 408 (via transition 430) to initiate a training sequence.

Transferring Payload Data

Payload control state 410 signals the beginning of a data burst. As used herein, a data burst refers to an uninterrupted transfer of data words on DAT[31:0]. In the presently described embodiment, a data burst terminates when either MaxBurst1 or MaxBurst2 (described above with reference to FIG. 3) have been satisfied or when the next control word is received. Following the transmission of a control word, a data bus in payload control state 410 then transitions to data burst state 404 via transition 412. In one embodiment of the present invention, the transition occurs immediately on the clock cycle following the transfer of the SOP control word.

In data burst state 404, data words are transferred over DAT[31:0] in bursts (uninterrupted transfers). As noted above, a data burst occurs on the next immediate clock cycle following the control word. Once a data burst transfer has begun, residence in data burst state 404 is maintained and data words continue to be sent over DAT[31:0] (represented by transition 416) until either an EOP control word is sent or an allowed number of 32-byte blocks has been reached. It is preferable that the maximum configured payload data transfer size be a multiple of 32 bytes or otherwise be terminated by and EOP control word. Upon the completion of a data burst, the data bus can transition to idle control state 402 (via transition 434) or the data bus can return to payload control state 410 (via transition 414) to send a new SOP control word to begin another data burst, or any other control word can be sent (e.g., an SOP for another channel).

In one embodiment, successive SOP control words should occur not less than 8 clock cycles apart. A cycle, as used herein, is defined as one control or data word (and because embodiments of the present invention utilize DDR, clock cycles as used herein can refer to DDR clock cycles and non-DDR clock cycles). Consequently, a data burst lasting less than 8 cycles could be filled with enough idle control words so that 8 cycles have passed since an SOP control word was last sent. For example, this can be accomplished by transitioning from data burst state 404 to idle control state 402 via transition 434 and sending at least enough idle control words to reach 8 cycles since the last SOP control word. However, a short data burst (i.e., an EOP burst) can be followed by another short data burst (i.e., an EOP burst). If a data burst has lasted at least 8 cycles and there is more payload data to transfer, the data path can transition to payload control state 410 to send a new SOP control word to initiate the new data burst. In such a case, a payload control word that separates two adjacent burst transfers contains status information pertaining to the previous transfer and the subsequent transfer.

Training Sequence

In accordance with one embodiment of the present invention, a training sequence can be used by a receiving device for deskewing bit arrival times on DAT[31:0], and also deskewing the CTL signal with DAT[31:0]. The training sequence is intended to allow the receiving device to correct relative skew differences up to +/−1 bit time. In general, the training sequence consists of 1 idle control word followed by one or more repetitions of a 20-word training pattern. In the presently described embodiment, a training pattern consists of 10 repeated training control words followed by 10 repeated data words. The initial idle control word is sent prior to the initial training control word in order to remove dependencies of the parity in the training control words from any preceding data words. In one embodiment of the present invention, the training control word is orthogonal to the training data word.

In one embodiment of the present invention, it is preferable that the training sequence be provided every DATA_MAX_T cycles, where DATA_MAX_T cycles is a programmable value. Additionally, it is preferable that the training pattern be repeated alpha ($\alpha$) times every DATA_MAX_T cycles. Table 3 illustrates a training pattern utilized by one embodiment of the present invention. In cycle 1, X, efgh, Y and abcd depend on the contents of the interval after the last preceding control word. For example, X and Y reflect whether the preceding data burst was an end of packet or the start of the next packet. The values of a, b, c, d, e, f, g, h depend on the parity of the preceding data.

TABLE 3

| Cycle | CTL | DAT[31:0] | | | | | | | | | | | | | | | |
|---|---|---|---|---|---|---|---|---|---|---|---|---|---|---|---|---|---|
| | | 31 | 30 | 29 | 28 | 27 | 26 | 25 | 24 | 23 | 22 | 21 | 20 | 19 | 18 | 17 |
| 1 | 1 | X | 0 | 0 | 0 | 0 | 0 | 0 | 0 | 0 | 0 | 0 | 0 | e | f | g |
| 2 to 11 | 1 | 0 | 0 | 0 | 0 | 1 | 1 | 1 | 1 | 1 | 1 | 1 | 1 | 1 | 1 | 1 |
| 12 to 21 | 0 | 1 | 1 | 1 | 1 | 0 | 0 | 0 | 0 | 0 | 0 | 0 | 0 | 0 | 0 | 0 |
| 20α − 18 to 20α − 9 | 1 | 0 | 0 | 0 | 0 | 1 | 1 | 1 | 1 | 1 | 1 | 1 | 1 | 1 | 1 | 1 |
| 20α − 8 to 20α + 1 | 0 | 1 | 1 | 1 | 1 | 0 | 0 | 0 | 0 | 0 | 0 | 0 | 0 | 0 | 0 | 0 |

| Cycle | DAT[31:0] | | | | | | | | | | | | | | | | |
|---|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 | 0 |
| 1 | h | 0 | Y | Y | 0 | 0 | 0 | 0 | 0 | 0 | 0 | 0 | 0 | a | b | c | d |
| 2 to 11 | 1 | 0 | 0 | 0 | 0 | 1 | 1 | 1 | 1 | 1 | 1 | 1 | 1 | 1 | 1 | 1 | 1 |
| 12 to 21 | 0 | 1 | 1 | 1 | 1 | 0 | 0 | 0 | 0 | 0 | 0 | 0 | 0 | 0 | 0 | 0 | 0 |
| 20α − 18 to 20α − 9 | 1 | 0 | 0 | 0 | 0 | 1 | 1 | 1 | 1 | 1 | 1 | 1 | 1 | 1 | 1 | 1 | 1 |
| 20α − 8 to 20α + 1 | 0 | 1 | 1 | 1 | 1 | 0 | 0 | 0 | 0 | 0 | 0 | 0 | 0 | 0 | 0 | 0 | 0 |

Referring to state diagram 400, training control state 408 is entered into from idle control state 402 by sending a training control word. After having transitioned to training control state 408, nine additional training control words are provided on DAT[31:0] making for a total of 10 training control words sent. Following the transfer of 10 training control words, the data bus transitions to training data state 406 to provide 10 repeated training data words. The transition between training control state 408 and training data state 406 is repeated until the bits transferred to the receiving device have been sufficiently deskewed. When a training sequence is first initiated (e.g., at startup of a receiving and transmitting device), the training sequence should be repeated until the receiving device stops transmitting a framing pattern via the status bus. In one embodiment, synchronization of the signals can be determined by the detection of consecutive sequences having matching parity (i.e., consecutive DIP-4) matches. When periodic training is performed, alpha ($\alpha$) determines the number of repetitions.

When periodic training is performed (as opposed to training at startup), the transmitting device should schedule the training sequence at least every DATA_MAX_T clock cycles. In addition, the training pattern should then be repeated alpha (α) times. DATA_MAX_T and α are both configurable values, and training sequences for each interface, receiving and transmitting, may be scheduled independently. It is preferable for the transmitting device to wait for the completion of the current data burst before starting the transmission of the training sequence and not interrupt a data burst with a training sequence.

Exemplary Timing Diagrams

Figure 5:
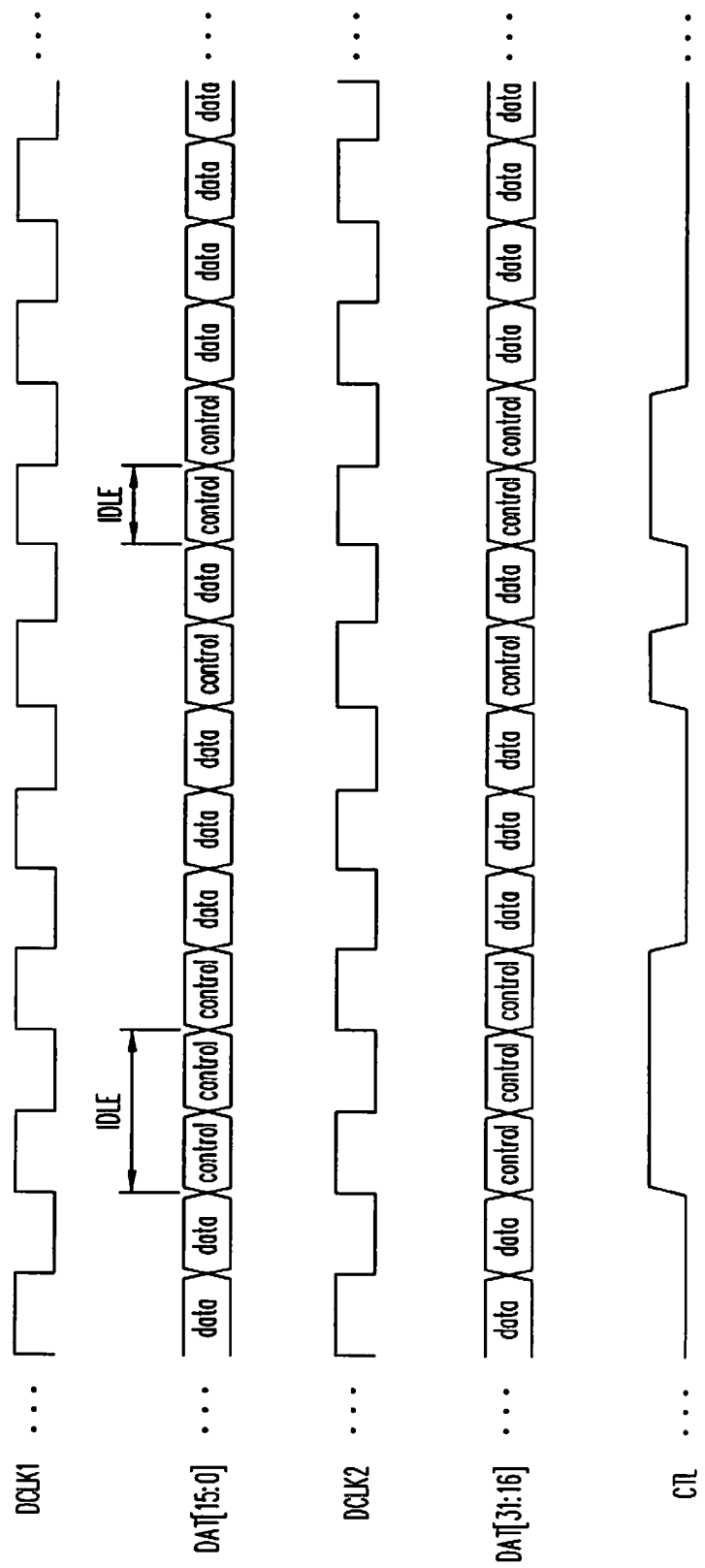
FIG. 5 illustrates a timing diagram in which data is aligned using static alignment in accordance with the present invention.

FIG. 5 illustrates a timing diagram in which data can be aligned using static alignment. Because static alignment generally requires that data signal traces be closely matched, associating fewer signals with a clock signal makes it easier to align the signals. Thus, by using two clock signals rather than one clock signal for 32 bits of data, the number of data signals matched to each clock is limited to 16. In static alignment, the data and the clock are transmitted to the receiver in a fixed phase relationship utilizing both DCLK1 and DCLK2. The lower 16 bits (bits 15-0) of control and data words are transferred on DAT[15:0] while the upper 16 bits (bits 31:15) of control and data words are transferred on DAT[31:15]. It is preferable that DAT[15:0] and CTL be matched within +/−2 bit times to DAT[31:16]. As used herein, DAT[15:0] and DAT[31:16] "match" when the variation in the propagation time between the transmitting device and the receiving device, and between DAT[15:0] and DAT[31:16] is less than two bit times. DCLK1 is used to sample DAT[15:0] and CTL while DCLK2 is used to sample DAT[31:16]. The receiving device should re-align DAT[31:16] and DAT[15:0] to a single clock. In one embodiment of the present invention, the alignment by the receiving device is done using the training sequence at start-up and the word alignment circuit of FIG. 6 (where start-up is defined as the point at which the devices are powered on and initialized).

Figure 6A:
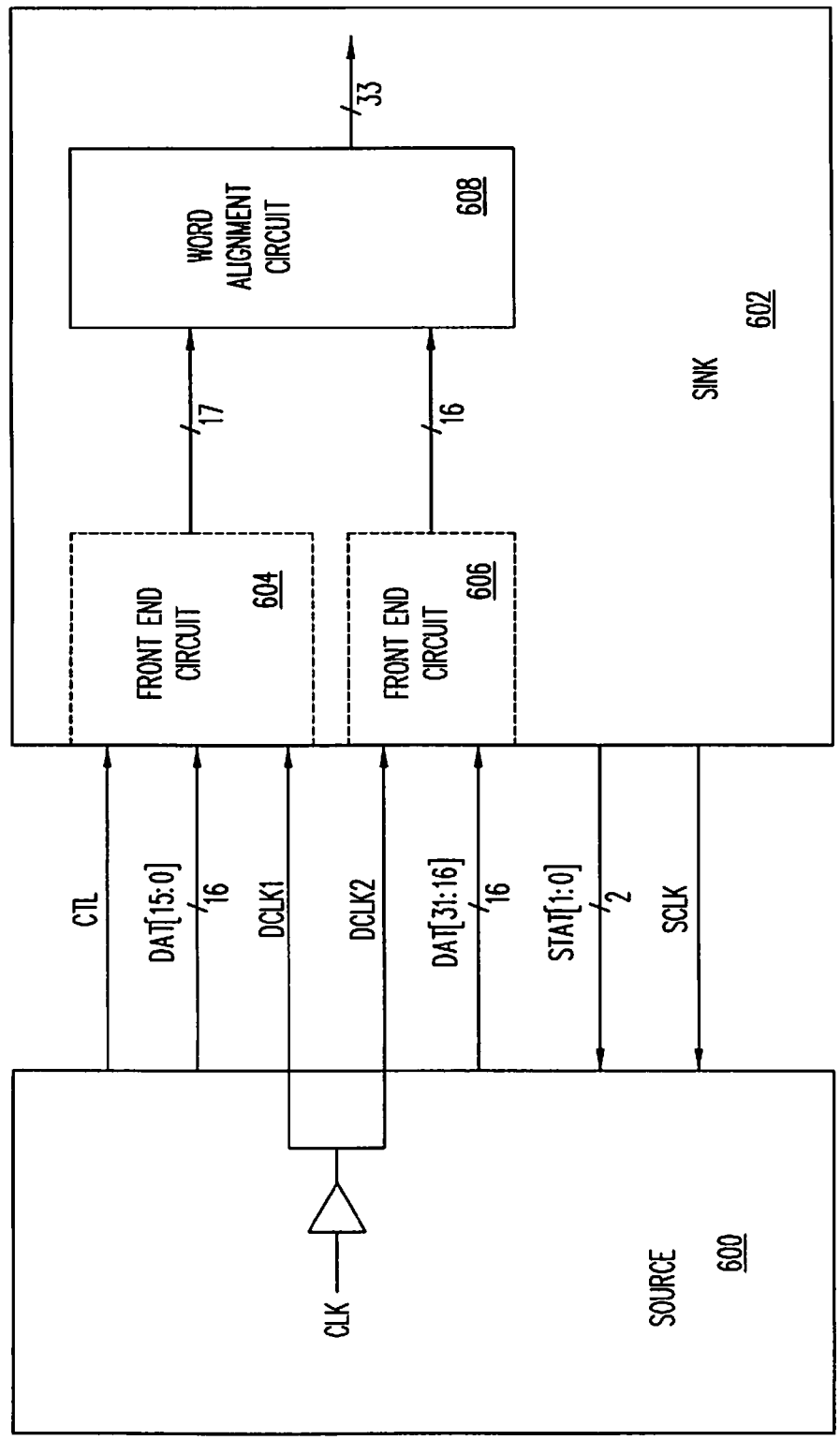
FIGS. 6A & 6B illustrate an exemplary word alignment circuit which can be utilized by a receiving device implementing one embodiment of the present invention.

FIG. 6A illustrates an example word alignment circuit which can be utilized to deskew a number of communication lines with respect to each other. As shown, a source 600 provides CLK1 and CLK2 to a sink 602. Sink 602 includes front end circuits 604 and 606. Front end circuit 604 receives CTL, DAT[15:0] and CLK1 and samples CTL and DAT[15:0] with CLK1. Similarly, front end circuit 606 receives CLK2 and DAT[31:16] and samples DAT[31:16] with CLK2. Because DAT[15:0] can be skewed from DAT[31:16], it is necessary to deskew the groups of signals with respect to each other. Accordingly, the present invention provides word alignment circuit 608 which receives DAT[15:0], CTL, and DAT[31:16] and deskews these signals with respect to each other.

Figure 6B:
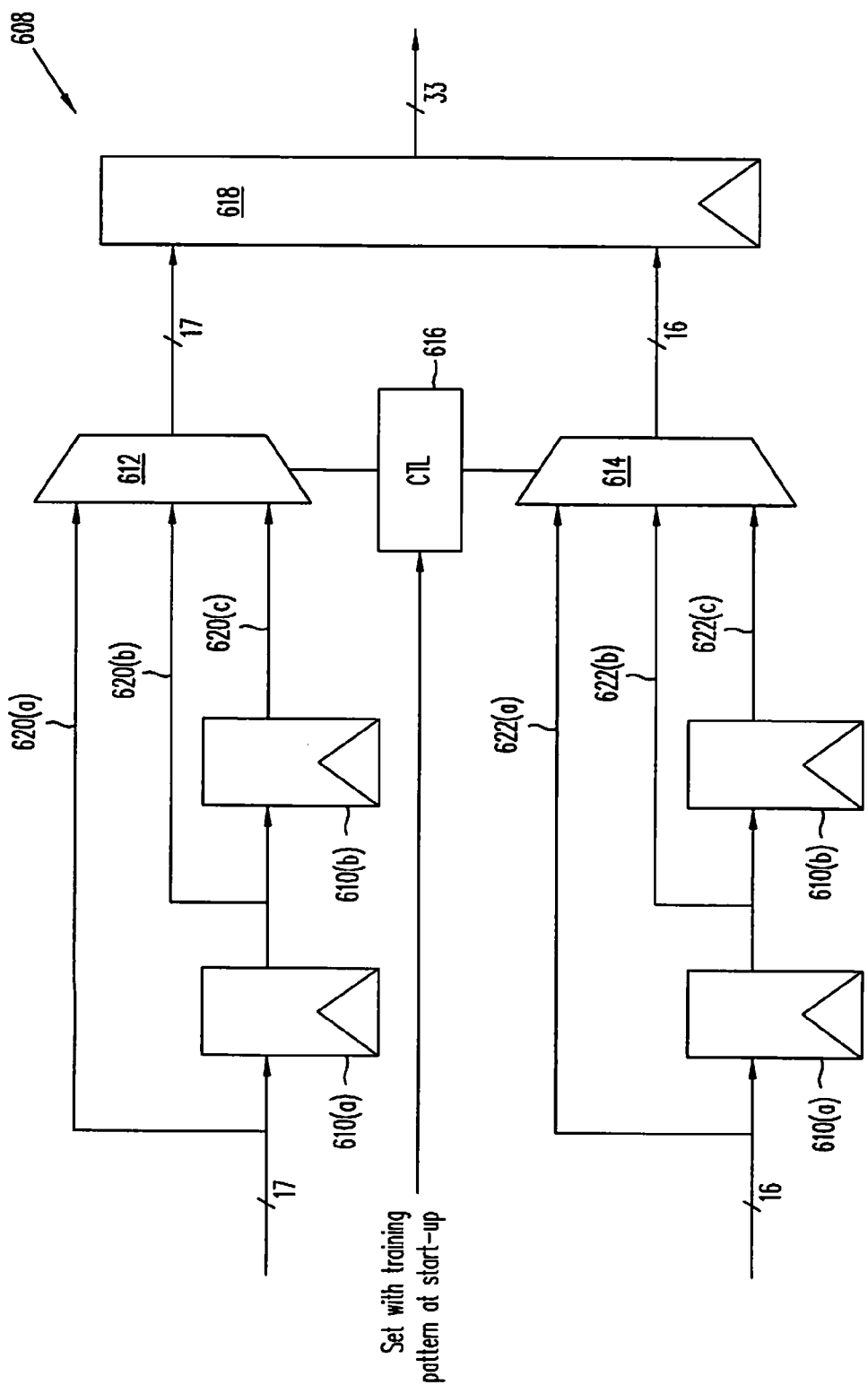

FIG. 6B illustrates one embodiment of a word alignment circuit 608. Word alignment circuit 608 includes data registers 610 multiplexers 612 and 614, a control circuit 616 and a data register 618. Data registers 610 provide delayed "versions" of DAT[31:0] and CTL to multiplexers 612 and 614. For example, DAT[15:0] and CTL are provided to multiplexer 612 on signal 620(a) without any delay. DAT[15:0] and CTL are delayed by data register 610(a) and provided to multiplexer 612 on signal 620(b). DAT[15:0] and CTL are delayed by both data registers 610(a) and 610(b) and provided to multiplexer 612 on signal 620(c). Thus, three different phases of DAT[15:0] and CTL are provided to multiplexer 612, an early phase on signal 620(a), a middle phase on signal 620(b), and a late phase on signal 620(c). Similarly, three difference phases of DAT[31:16] are provided to multiplexer 614 via signals 622(a), 622(b), and 622(c).

Control 616 is coupled to the select lines of multiplexer 612 and 614 and is configured to a version of DAT[15:0] and CLT from multiplexer 612 that matches with a version of DAT[31:16] from multiplexer 614. For example, if a middle phase of DAT[15:0] and CTL (provided on data signal 620(b)) matches a late phase of DAT[31:16] (provided on signal 622(c)), control 616 selects signal 620(b) from multiplexer 612 and signal 622(c) from multiplexer 614. So that control 616 selects the signals at the appropriate time to align the outputs from each multiplexer 612 and 614 with each other, control 616 is set during the training sequence provided at start-up.

Figure 7:
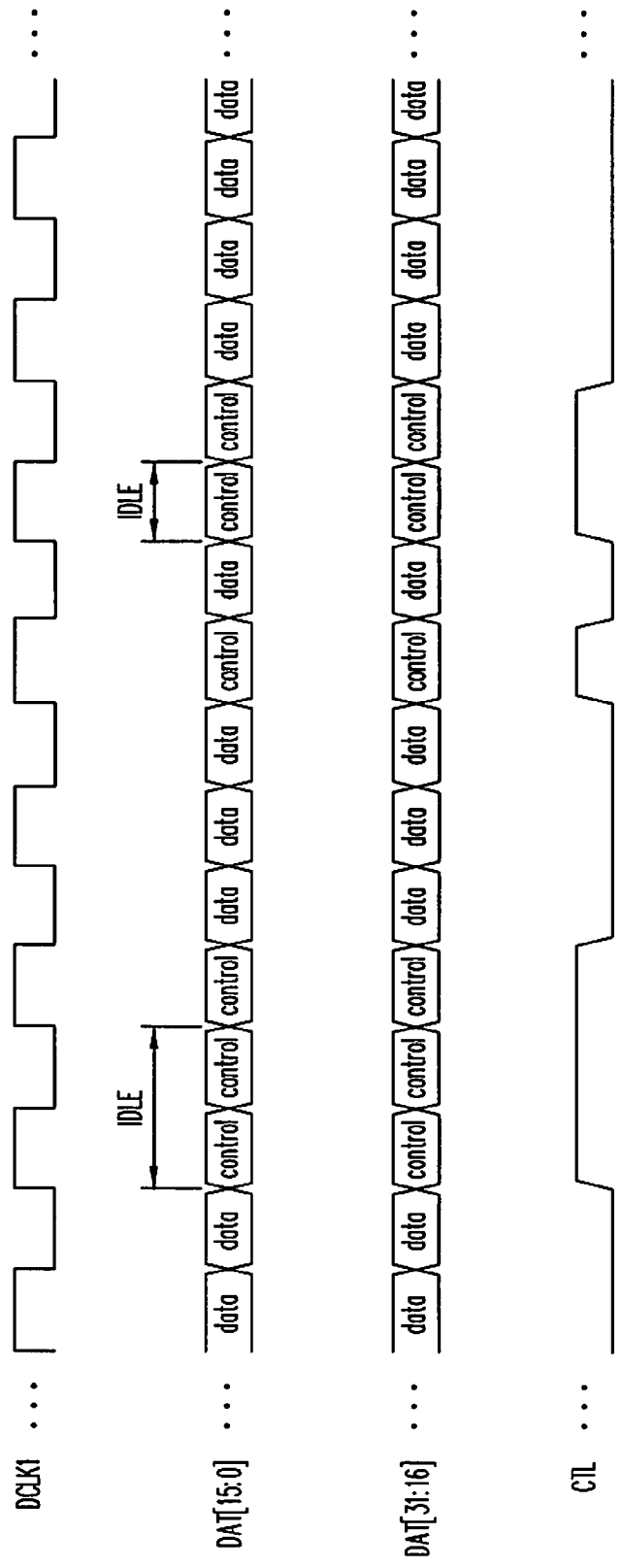
FIG. 7 illustrates a timing diagram in which data is aligned using dynamic alignment in accordance with the present invention.

FIG. 7 illustrates a timing diagram in which data is aligned using dynamic alignment. In FIG. 7, it is assumed that bits DAT[31:0] and CTL are not aligned with respect to DCLK1. It is preferable to use dynamic alignment when the signal path length and/or the frequency of operation create significant skew between clock and data. In one embodiment, the source device tri-states the additional clock signal (e.g., DCLK2). As shown in FIG. 7, control words and data words are transferred on DAT[31:0] with every rising and falling edge of CLK1. In one embodiment, the upper portion (i.e., bits 31:16) of the data words and control words are provided on DAT[31:16] and the lower portion (i.e., bits 15:0) re provided on DAT[15:0]. A single control line is used to distinguish data words from control words on DAT[31:0]. CTL is high when a control word is on DAT[31:0].

Figure 8:
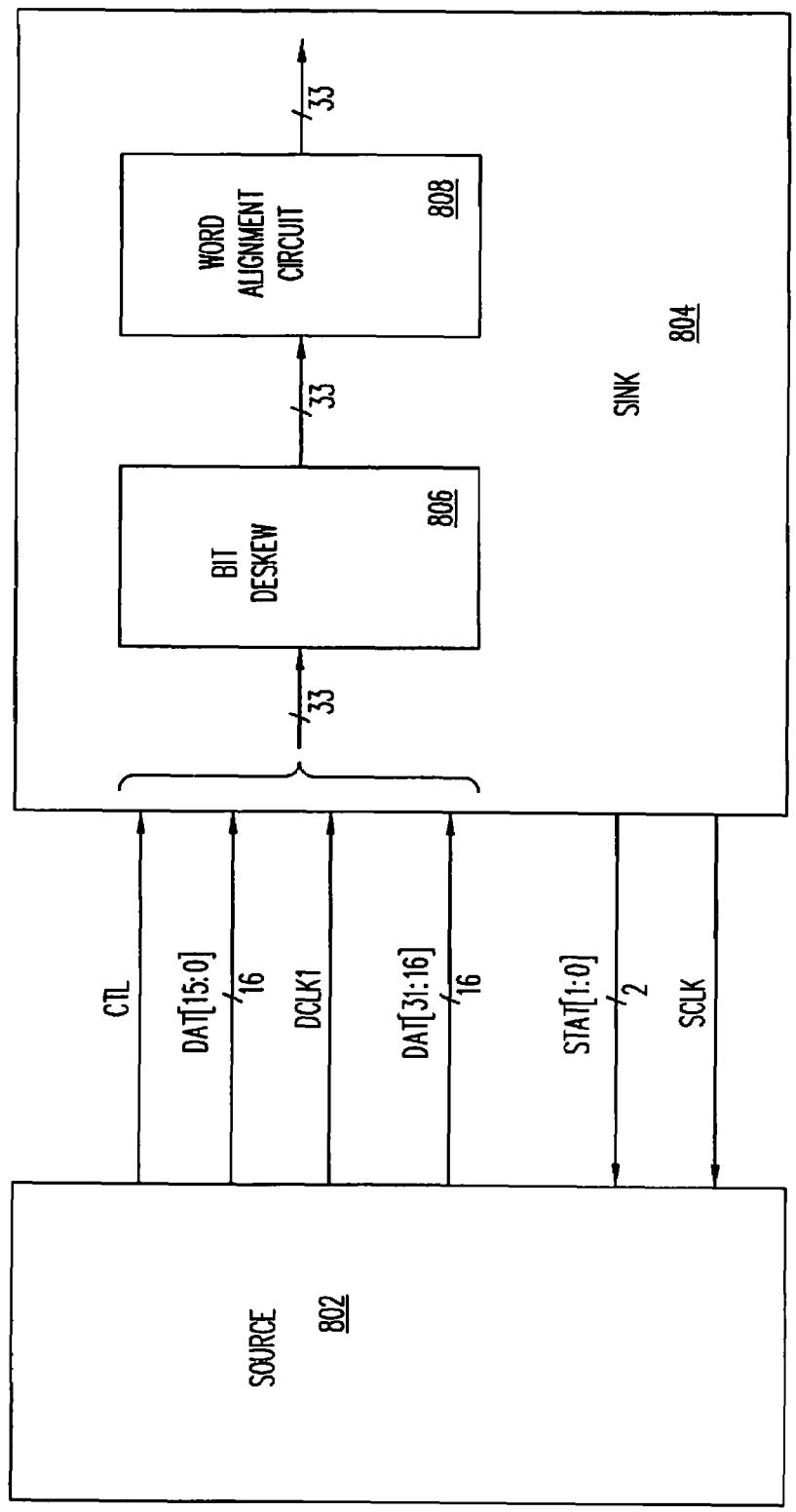
FIG. 8 illustrates clocking with dynamic alignment for an interface in accordance with one embodiment of the present invention.

FIG. 8 illustrates clocking with dynamic alignment for an interface in accordance with one embodiment of the present invention. As shown in FIG. 8, a source 802 provides CTL, DAT[31:0], and DCLK1 signals to sink 804. Sink 804 provides STAT[1:0] and SCLK signals to source 802. Sink 804 includes a bit deskew circuit 806 and a word alignment circuit 808. Generally, bit deskew circuit samples DAT[31:0] and CLK with respect to the clock signal to locate a window in which data transitions of the signals are occurring and then determines a sample point centered in the window. Word alignment circuit 808 detects the training pattern provided by source 802 and uses a known version of the training pattern to adjust alignment of the bits of data so they are aligned within the word.

FIFO Status

An interface in accordance with the present invention enables a receiving device storing the data words in queues (not shown) to transmit queue status to the transmitting device. The transfer of fifo status allows for, among other advantages, the efficient transfer of data words over the interface of the present invention.

Figure 9:
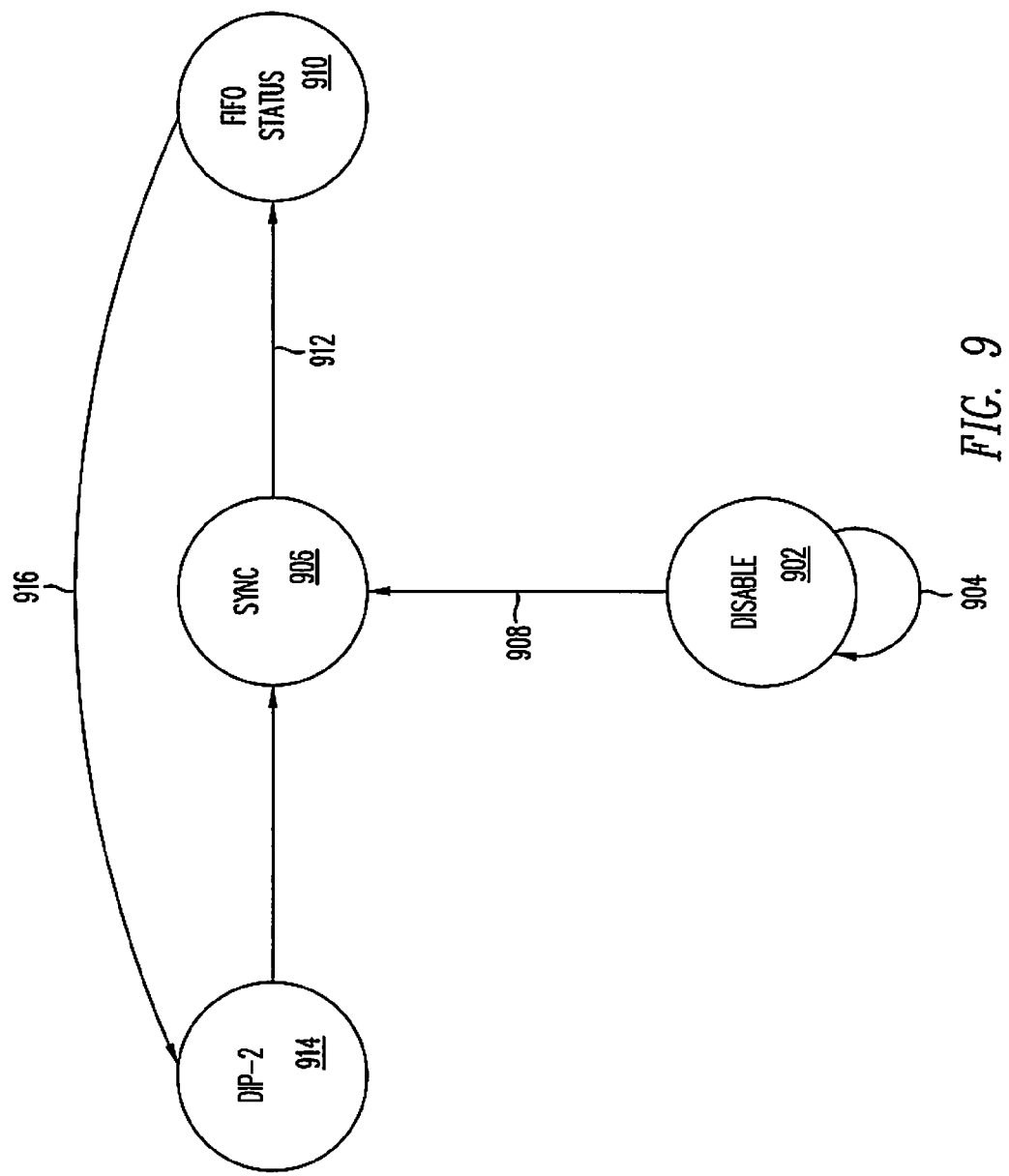
FIG. 9 is a state diagram illustrating the states of a status bus in accordance with the present invention.

FIG. 9 is a state diagram 900 illustrating how status is provided from a receiving device to a transmitting device over a status bus in accordance with the present invention (e.g., transmit status bus 212 or receive status bus 216). Initially, the status bus is in disable state 902 and configured to send a "1 1" over STAT[1:0] (i.e., transmits a 1 on STAT[1] and a 1 on STAT[0]). When fifo status transmission is enabled, the status bus transitions to sync state 906 via transition 908. For example, in one embodiment, FIFO status transmission can be enabled by a control processor (not shown) that is initializing a receiving device and a transmitting device. Within sync state 906, a receiving device transfers a framing pattern over STAT[1:0]. In one embodiment, a "1 1" is transferred over STAT[1:0] as the framing pattern. The transfer of a framing pattern transitions the status bus from sync state 906 to fifo status state 910 via transition 912.

In fifo status state 910, the receiving device sends the fifo status to the transmitting device. In the present embodiment, the fifo status may be one of three values: "SATISFIED", "HUNGRY", and "STARVING". A status of "SATISFIED"

is indicated by the presence of "1 0" on STAT[1:0], "HUNGRY" is indicated by the presence of "0 1" on STAT[1:0], and "STARVING" is indicated by "0 0" on STAT[1:0].

The status of "HUNGRY" indicates to a transmitting device that the transmitting device can transfer up to MaxBurst2 32-byte blocks to the corresponding port until the next status update is provided. Alternatively, if the corresponding port was previously granted a value larger than 32-byte blocks (e.g., MaxBurst1) which have not been used, the greater value of 32-byte blocks can be transferred to the HUNGRY port. The status of "STARVING" signals that the transmitting device can transfer up to MaxBurst1 32-byte blocks to the corresponding port until the next status update. The status of "SATISFIED" signals that a transmitting device can only transfer the remaining number of 32-byte blocks previously granted to that port until the next status update. Partial 32-byte transfers are treated as a full 32-byte transfer.

One embodiment of the present invention utilizes a programmable calendar sequence to indicate which status on the status bus corresponds to which port. As an example of programming the calendar, the first status following the framing pattern-corresponds to port(1), the second status corresponds to port(2), etc, with the last status corresponding to port (CALENDAR_LEN). The sending of the status for calendar entries 1 to CALENDAR_LEN equals one iteration. Sending of the fifo status is complete when a programmable number of iterations have been transferred.

Upon completion of the transfer of the FIFO status, the status bus transitions to DIP-2 state 914 via transition 916 to send the parity information for the preceding fifo status. In one embodiment, the parity is a 2-bit Diagonal Interleaved Parity (DIP-2) as described in "System Packet Interface Level 4 (SPI-4) Phase 2: OC-192 System Interface for Physical and Link Layer Devices, Optical Internetworking Forum Implementation Agreement, January 2001". FIG. 10 is a timing diagram showing the sequence of SCLK, STAT[1], and STAT[0] signals.

Modes of Operation

The present interface is compatible with the interface described in "System Packet Interface Level 4 (SPI-4) Phase 2: OC-192 System Interface for Physical and Link Layer Devices, January 2001" (the SPI-4.2 interface). For example, a device employing the present invention can interface directly with a device employing the SPI-4.2 interface, as described below.

Figure 11:
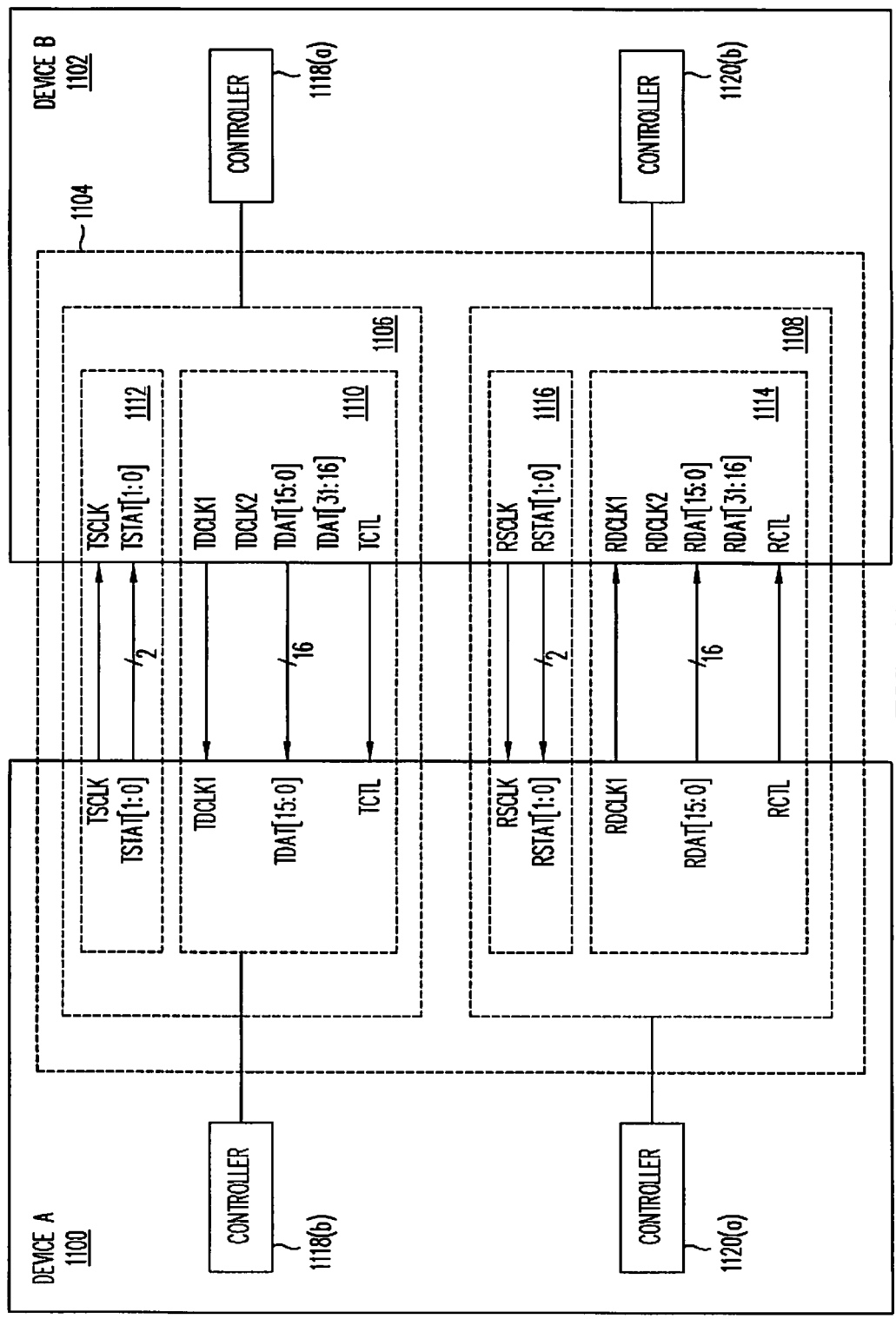
FIG. 11 is a block diagram illustrating the compatibility of an interface in accordance with the present invention.

FIG. 11 illustrates a device 1100 coupled to a device 1102. Device 1102 is configured to support only the SPI-4.2 interface while device 1100 is configured to support an interface according to the present invention (e.g., interface 200 of FIG. 2) and in addition is configured to support the SPI-4.2 interface. As such, device 1102 can communicate with device 1100 over the SPI-4.2 interface. In one embodiment, devices 1100 and 1102 are integrated circuits utilized for the transfer of packets within a network device.

In one embodiment of the present invention device 1102 can be configured, via controllers 1118(*a*) and 1120(*b*), to operate in one of two modes, a normal mode and an enhanced mode. For example, controller 1118(*a*) contains a mode select bit that, when set (i.e., set to "1"), configures device 1102 to operate in an enhanced mode, and when cleared (i.e., cleared to "0") configures device 1102 to operate in normal mode. In a normal mode of operation device 1102 functions in compliance with the SPI-4.2 interface. In normal mode, device 1102 tri-states TDAT[31:16], RDAT[31:16], TDCLK2, and RDCLK2. By tri-stating these signals, they are not sent to device 1100. Additionally, when in normal mode, device 1102 does not report parity errors for the extended 4-bit diagonal interleaved parity. Device 1102 can also be configured to operate in extended mode, via controller 1118(*a*) and 1120(*b*). The enhanced mode of operation, described above with respect to FIGS. 1-11 enables device 1102 to transfer data at significantly greater data rates (e.g., 20 Gbs).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   transferring a payload control information between a first integrated circuit (IC) and a second IC utilizing a plurality of data transmission lines;
   on a clock cycle transition following said transferring said payload control information, transferring a packetized data between said first IC and said second IC utilizing said plurality of data transmission lines, wherein said transferring said packetized data is performed at a data rate of at least 19 Gbps;
   transferring a FIFO status between said first IC and said second IC over a plurality of FIFO status lines, wherein said FIFO status is transferred simultaneously with providing said payload control information; and
   transferring a one-bit control signal to identify when said payload control information is present on all of said plurality of data transmission lines.

2. The method of claim 1 further comprising:
   configuring at least one of said first IC and said second IC to operate in an enhanced mode, wherein said transferring said packetized data is performed at a rate of approximately 19 Gbps in said enhanced mode.

3. The method of claim 1 further comprising:
   configuring at least one of said first IC and said second IC to operate in at least one of a normal mode and an enhanced mode, wherein said transferring said packetized data is performed at a rate of approximately 10 Gbps in said normal mode.

4. The method of claim 1 wherein said transferring said payload control information comprises:
   transferring a port address for said packetized data.

5. The method of claim 1 wherein said transferring said payload control information comprises:
   transferring a parity for said packetized data.

6. The method of claim 5 further comprising:
   transferring an extended end of packet status.

7. The method of claim 5 further comprising:
   transferring an extended parity.

8. The method of claim 1 further comprising:
   providing a data clock signal from said first IC to said second IC; and
   providing a FIFO status clock signal from said first IC to said second IC.

9. The method of claim 1 further comprising:
   providing a data clock signal between said first IC and said second IC to clock said payload control information and said packetized data, wherein said data clock has a minimum frequency of 311 MHz; and
   clocking said payload control information and said packetized data on both a rising edge and a falling edge of said data clock signal.

10. The method of claim 1 where said first IC and said second IC are configured to operate at different network layers.

11. The method of claim 10 wherein said first network integrated circuit operates at a physical layer.

12. The method of claim 10 wherein said second integrated circuit operates at a link layer.

13. The method of claim 1 further comprising:
dynamically aligning said packetized data.

14. The method of claim 1 further comprising:
statically aligning said packetized data.

15. The method of claim 1 further comprising:
training said first integrated circuit to deskew said packetized data transferred on said data transmission lines.

16. The method of claim 15 further comprising:
transferring training control information between said first IC and said second IC utilizing a plurality of data transmission lines; and
on the clock cycle transition following said transferring said training control information, transferring said training data between said first IC and said second IC utilizing said plurality of data transmission lines.

17. The method of claim 1 wherein payload control information is present on said plurality of data transmission lines when said one bit control signal is a logic 1.

18. A system comprising:
a first integrated circuit (IC);
a second IC; and
an interface coupling said first IC to said second IC, said interface configured to:
    transfer a payload control information between said first IC and said second IC utilizing a plurality of data transmission lines;
    on a clock cycle transition following said transfer said payload control information, transferring a packetized data between said first IC and said second IC utilizing said plurality of data transmission lines, wherein said transferring said packetized data is performed at a data rate of at least approximately 19 Gbps;
    transfer a FIFO status between said first IC and said second IC over a plurality of FIFO status lines, wherein said FIFO status is transferred simultaneously with providing said payload control information; and
    transfer a one-bit control signal to identify when payload control information is present on all of said plurality of data transmission lines.

19. The system of claim 18, wherein said interface comprises:
a transmit interface; and
a receive interface.

20. The system of claim 19, wherein said transmit interface comprises:
a transmit status bus; and
a transmit data bus.

21. The system of claim 20, wherein said transmit status bus comprises:
a transmit status clock signal; and
a first and a second transmit status signal.

22. The system of claim 20, wherein said transmit data bus comprises:
a first and a second transmit data clock signal;
at least 32 transmit data signals; and
a transmit control signal.

23. The system of claim 19, wherein said receive interface comprises:
a receive status bus; and
a receive data bus.

24. The system of claim 23, wherein said receive status bus comprises:
a receive status clock signal; and
a first and a second receive status signal.

25. The system of claim 24, wherein said receive data bus comprises:
a first and a second receive data clock signal;
at least 32 receive data signals; and
a receive control signal.

26. The system of claim 19, wherein said interface further comprises:
a controller including a mode selection bit to operate said interface in an enhanced mode and a normal mode, wherein a data rate of said interface in enhanced mode is approximately equal to twice a data rate of the interface in normal mode.

27. A system comprising:
a first integrated circuit (IC) coupled to a second IC;
means for transferring a payload control information between said first IC and said second IC;
means for transferring a packetized data between said first IC and said second IC utilizing said plurality of data transmission lines, wherein said means for transferring said packetized data is operable at a data rate of at least 19 Gbps;
means for transferring a FIFO status between said first IC and said second IC over a plurality of FIFO status lines, wherein said means for transferring FIFO status is operable to transfer said FIFO status simultaneously with providing said payload control information; and
means for transferring a one-bit control signal to identify when payload control information is present on all of said plurality of data transmission lines.

28. The system of claim 27 further comprising:
means for configuring at least one of said first IC and said second IC to operate in at least one of a normal mode and an enhanced mode, wherein said means for transferring said packetized data is performed at a rate of 9 Gbps in said normal mode and 19 Gbps in said enhanced mode.

29. The system of claim 27 where said first integrated circuit and said second integrated circuits are configured to operate at different network layers.

30. The system of claim 29 wherein said first network integrated circuit operates at a physical layer.

31. The system of claim 29 wherein said second integrated circuit operates at the link layer.

32. The system of claim 27 further comprising:
means for dynamically aligning said packetized data.

33. The system of claim 27 further comprising:
means for statically aligning said packetized data.

34. The system of claim 27 further comprising:
means for training said first IC to deskew said packetized data transferred on said data transmission lines.

35. An apparatus comprising:
a transmit data bus configured to transmit a payload control information, and
    on a clock cycle transition following a transfer of said payload control information, transmit a packetized data, wherein said transmission of said packetized data is performed at a data rate of at least approximately 19 Gbps;
a one bit transmit control signal to identify whether data on said transmit data bus is payload control information or packetized data;
a receive data bus configured to
    receive payload control information, on a clock cycle transition following receipt of said payload control information, receive packetized data, wherein said packetized data is received at a data rate of at least approximately 19 Gbps, and wherein said receive data bus operates independently of said transmit data bus, and transfer a FIFO status over a plurality of FIFO status lines, wherein said FIFO status is transferred simultaneously with providing said payload control information; and a one bit receive control signal to identify whether data on said receive data bus is payload control information or packetized data.

36. The apparatus of claim 35, wherein said receive data bus comprises:
a first and a second receive data clock signal; and
at least 32 receive data signals.

37. The apparatus of claim 35, wherein said transmit data bus comprises:
a first and a second transmit data clock signal; and
at least 32 transmit data signals.

38. The apparatus of claim 35, further comprising:
a controller including a mode selection bit to operate said transmit data bus and said receive data bus in an enhanced mode and a normal mode, wherein a data rate of said interface in enhanced mode is approximately equal to twice a data rate of the interface in normal mode.

39. An apparatus comprising:
means for providing payload control information;
on the clock cycle transition following a transfer of said payload control information, means for providing packetized data at a data rate of at least 19 Gbps;
means for identifying whether data is payload control information or packetized data;
means for receiving payload control information; and
on the clock cycle transition following receipt of said payload control information, receiving packetized data at a data rate of at least 19 Gbps, and wherein said means for receiving packetized data operates independently of said means for providing said packetized data.

40. The apparatus of claim 39, wherein said means for receiving said packetized data comprises:
a first and a second receive data clock signal; and
at least 32 receive data signals.

41. The apparatus of claim 39, wherein said means for providing said packetized data comprises:
a first and a second transmit data clock signal; and
at least 32 transmit data signals.

42. The apparatus of claim 35, further comprising:
means for operating said means for providing said packetized data and said means for receiving said packetized data in an enhanced mode and a normal mode, wherein a data rate of said interface in enhanced mode is approximately equal to twice a data rate of the interface in normal mode.

43. The method of claim 1 further comprising:
providing a first data clock signal and a second data clock signal between said first IC and said second IC, wherein said first data clock signal corresponds to a first sixteen data transmission lines of said plurality of data transmission lines, and said second data clock signal corresponds to a second sixteen data transmission lines of said plurality of data transmission lines, and said first and second data clock signals have a minimum frequency of 311 MHz;
clocking said payload control information and said packetized data on both a rising edge and a falling edge of said data clock signals.

44. The method of claim 43 further comprising realigning said first sixteen data transmission lines of said plurality of data transmission lines with said second sixteen data transmission lines of said plurality of data transmission lines.

45. The method of claim 14 wherein said statically aligning comprises:
requiring that a first sixteen data transmission lines of said plurality of data transmission lines and a second sixteen data transmission lines of said plurality of data transmission lines be matched to within 2 bit times.

46. The method of claim 1 further comprising:
providing three phases of data carried on a first sixteen data transmission lines,
wherein each of the three phases is delayed by a different amount;
providing three phases of data carried on a second sixteen data transmission lines,
wherein each of the three phases is delayed by a different amount;
providing a control signal to match one of the three phases of said first sixteen data transmission lines with one of the three phases of said second sixteen data transmission lines.

47. The method of claim 13 wherein said dynamically aligning further comprises:
sampling said plurality of data transmission lines, wherein said sampling comprises determining which of said plurality of data transmission lines are transitioning during a time window;
selecting a sample point within said time window;
detecting a training pattern, wherein said detecting is performed by a bit deskew circuit; and
using said training pattern to align said plurality of data transmission lines.

* * * * *